Jan. 28, 1958 E. P. MOSLO 2,821,481
SUCKER STICK
Filed April 11, 1956

INVENTOR.
Ernest P. Moslo
BY
Hyde, Meyer, Baldwin & Doran
Attorneys

United States Patent Office 2,821,481
Patented Jan. 28, 1958

2,821,481

SUCKER STICK

Ernest P. Moslo, Cleveland, Ohio

Application April 11, 1956, Serial No. 577,472

1 Claim. (Cl. 99—138)

This invention relates to support means for ice cream bars, suckers and the like and more particularly to molded plastic sticks for such items.

An object of the present invention is to provide a plastic stick for supporting a briquette of edible material, said stick having a token, which is removable upon consumption of the edible material, which forms a prize or keepsake for the consumer.

Another object of the present invention is to provide a plastic stick, for supporting a briquette made of moldable edible material, having a core portion adapted to extend within the briquette, said core portion having an irregular opening therethrough whereby said moldable edible material may be securely bonded to the core portion of the stick.

Still another object of the present invention is to provide an attractive sucker stick containing a removable novel prize or token which acts as an inducement for the prospective consumer to purchase.

Another object of the present invention is to provide a sucker stick characterized by its structural simplicity, its aesthetic qualities, and its low manufacturing cost. Other features of this invention reside in the arrangement and design of the parts for carrying out their appropriate functions.

Further objects of the present invention and certain practical advantages will be referred to in or will be evident from the following description of one embodiment of the invention, as illustrated in the accompanying drawings in which.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Figure 1:
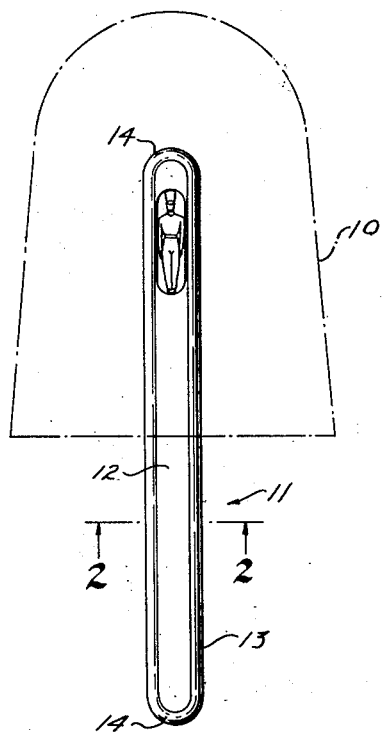
Fig. 1 is a front elevational view of the novel sucker stick having a briquette of moldable edible material outlined in dot-dash lines.
Figure 2:
Fig. 2 is a transverse sectional view enlarged, taken along the plane of line 2—2 of Fig. 1.
Figure 3:
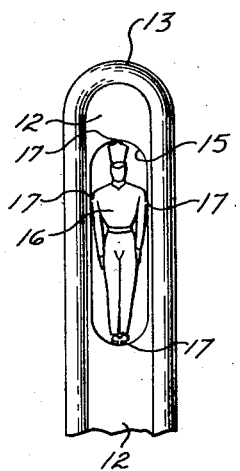
Fig. 3 is an enlarged fragmental view of the core portion of the sucker stick which is adapted to extend within the moldable edible briquette and showing the details of the statuette and its securement to the sucker stick.

Refer now to Fig. 1 wherein I have shown means for supporting a briquette of moldable edible material such as ice cream, sucker candy and the like. The moldable edible material is shown in outline form by dot-dash lines 10 and obviously may take any outline shape. The support means comprises an elongated substantially rectangular body 11 having a substantially flat planar web 12 as seen in Fig. 2 and preferably an enlarged bead-like molding 13 extending around the entire peripheral edge of the body 11. The distal ends of the body 11 are rounded at 14 so as to eliminate any sharp edges and thereby reduce the hazard of an accidental injury.

The body of the sucker stick comprises two main portions, namely, a handle portion which is that part projecting exteriorly of the briquette 10 and a core portion which is adapted to extend within the briquette. The core portion is provided with an elongated aperture 15 near its uppermost end. The aperture 15 is formed entirely within the web 12 of the body 11 in such a manner that its side edges terminate just short of the enlarged beaded molding 13. A small statuette 16 having aesthetic or entertaining qualities is contained within the aperture 15 and lies wholly within the planes of the outer surfaces of the core portion of the body 11. The statuette 16 is secured to the peripheral edges of the aperture 15 solely by means of small connecting lugs 17 which may be easily broken, without in any way damaging the statuette, for quick removal of the statuette from the sucker stick upon consumption of the edible briquette.

It will be noted that the statuette 16 (and this would be true of most statuettes) provides irregular edges between itself and the edges of the apertures 15. Thus, when the briquette of edible material is molded around the core portion of the sucker stick, a portion of the moldable material flows into these irregular spaces contained between the statuette and the edges of the aperture 15 to form an excellent bond between the moldable edible material and the core portion of the stick 13.

The entire sucker stick, including the statuette, may be formed in one easy molding operation. Excellent results have been achieved through the use of polyvinyl and polyethylene plastics in the molding operation. However, any suitable plastic may be used.

It will be readily seen that the beaded molding 13 surrounding the entire periphery of the body 11 provides additional reinforcing and substantially adds to the rigidity of the stick. In addition, the beaded molding provides the stick with a somewhat irregular surface which aids in bonding the briquette to the stick and is extremely easy to hold. The beaded molding 13 provides a smooth edge for the encircling palm of the hand while the web portion 12, between the beaded molding 13, provides a convenient resting place for the fingers and thumb. The raised edges or molding 13 of the stick also aid in preventing undue slippage while the edible briquette is being consumed.

The present sucker stick is of particular value when the edible material is composed of a transparent material wherein the prospective consumer can actually see the easily removable statuette. The statuette is placed in the core portion of the stick so that it becomes necessary to first consume the edible material before access can be had to the statuette. The use of this novel sucker stick has been found to be an effective stimulus to purchase the particular confection employing its use.

In view of the foregoing description, taken in conjunction with the accompanying drawings, it is believed that a clear understanding of the construction, operation and advantages of the device will be quite apparent to those skilled in this art.

Having thus described my invention and illustrated its use, what I claim is new and desire to secure by Letters Patent is:

Means for supporting a briquette of moldable edible material, and for retaining said briquette thereon during consumption thereof, comprising a handle portion adapted to protrude from said briquette and a core portion adapted to extend within the briquette, said core portion having an aperture therethrough, a statuette fixed to a peripheral edge portion of said aperture by narrow breakable lugs only, said statuette providing irregular edges around said statuette and spaced inwardly from the edges of said aperture for bonding moldable edible material securely to said core portion, a peripheral bead about the edges of said handle and core portion, said statuette being contained wholly within the planes of the outer surfaces of said bead, and said bead having a smoothly rounded end embedded in the edible material, whereby a child is protected from sharp edges while eating said briquette, after which he can break said lugs to obtain said statuette as a plaything.

References Cited in the file of this patent

UNITED STATES PATENTS

| | | |
|---|---|---|
| D. 114,752 | De Laurentis | May 16, 1939 |
| 1,913,851 | Oprean | June 13, 1933 |
| 1,929,906 | Skokowski | Oct. 10, 1933 |
| 2,469,589 | Barricini | May 10, 1949 |